L. B. PAXSON.
POWER TRANSMISSION MECHANISM.
APPLICATION FILED OCT. 23, 1917.

1,296,212.

Patented Mar. 4, 1919.
3 SHEETS—SHEET 1.

Levi B. Paxson, Inventor

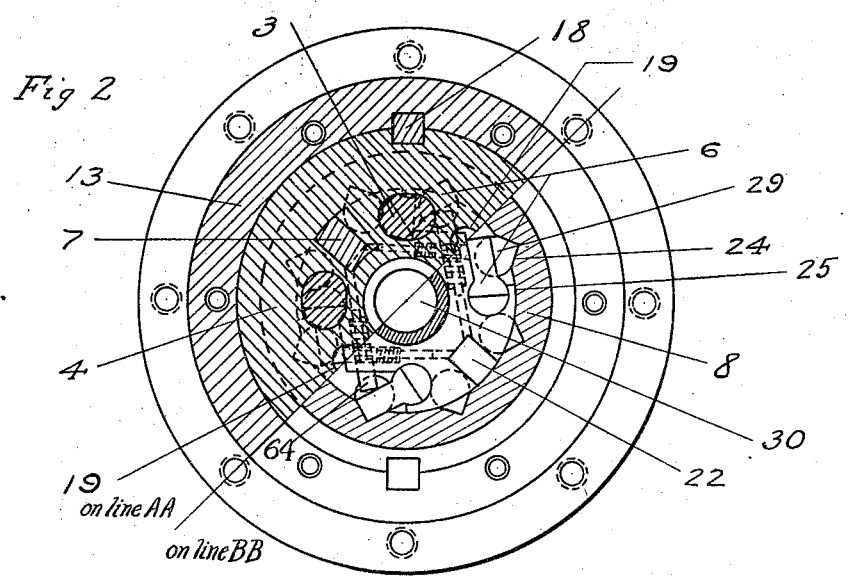
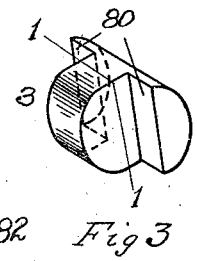
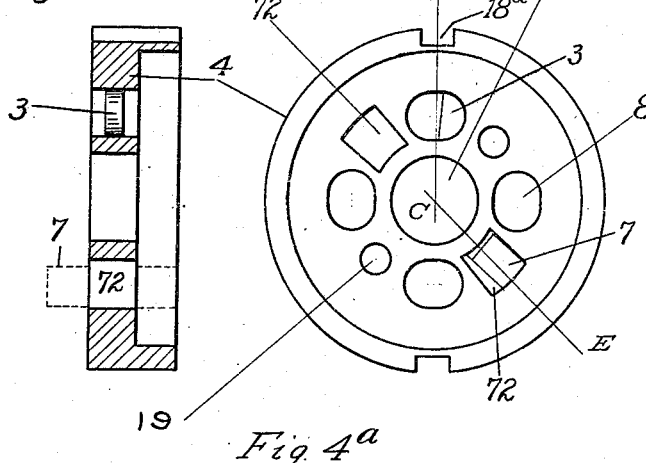

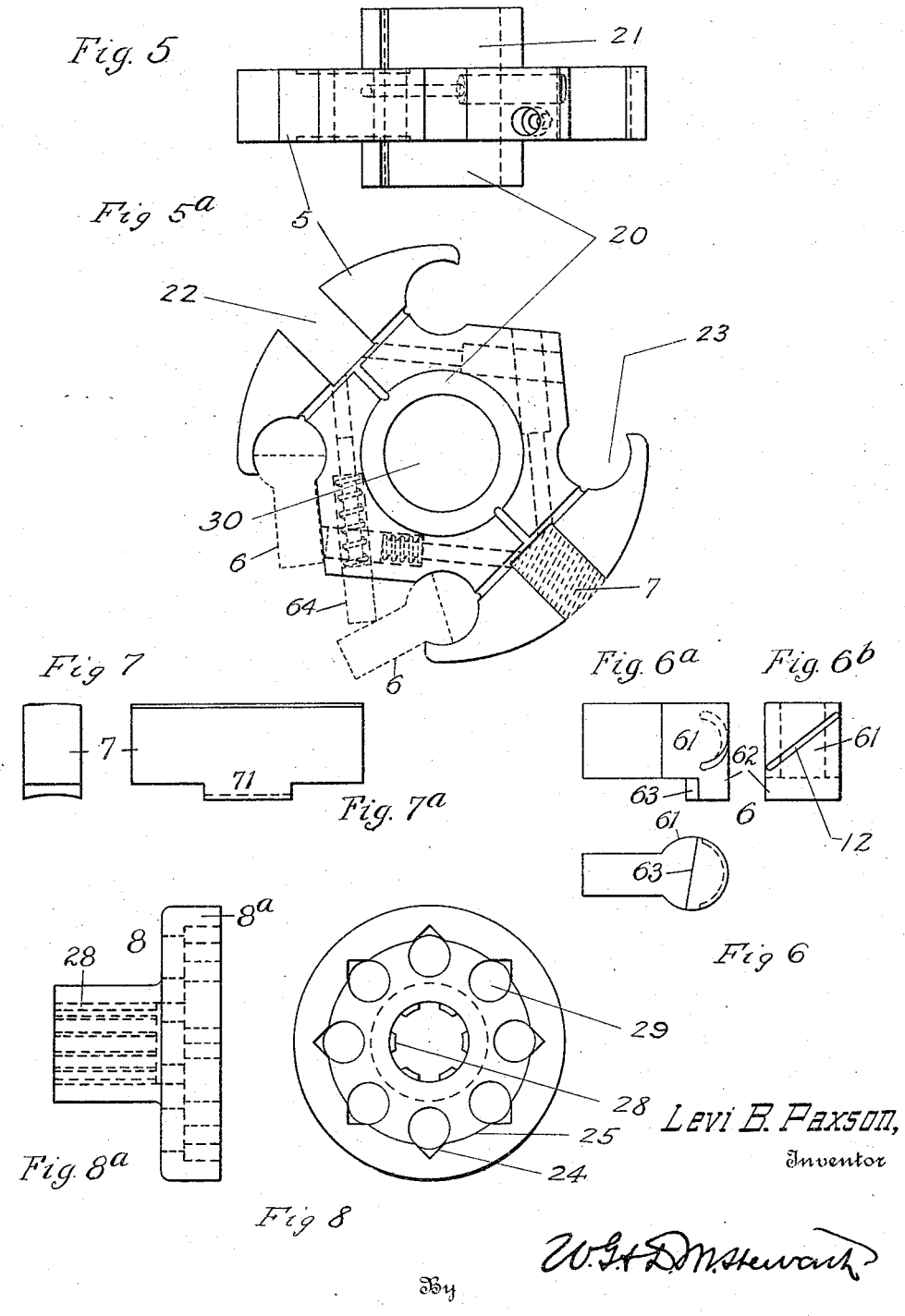

UNITED STATES PATENT OFFICE.

LEVI B. PAXSON, OF NORRISTOWN, PENNSYLVANIA.

POWER-TRANSMISSION MECHANISM.

1,296,212.  Specification of Letters Patent.  Patented Mar. 4, 1919.

Application filed October 23, 1917. Serial No. 198,045.

*To all whom it may concern:*

Be it known that I, LEVI B. PAXSON, a citizen of the United States, residing at the city of Norristown, in the county of Montgomery and State of Pennsylvania, have invented certain new and useful Improvements in Power-Transmission Mechanism, of which the following is a specification.

My invention relates particularly to power transmission mechanism adapted for motor driven vehicles; and my main object is to provide improved means for permitting differential movement to the driven wheels as required when the vehicle is rounding curves forwardly or rearwardly. The invention is fully described in connection with the accompanying drawings illustrating a preferred embodiment thereof, and the novel features are clearly defined in the subjoined claims.

Fig. 2 is a cross-sectional view, partly on the line A—A and partly on the line B—B of Fig. 1, the axle housing and drive-gear ring being omitted.

Fig. 3 is a perspective view of a detached driving disk insert.

Figure 1:
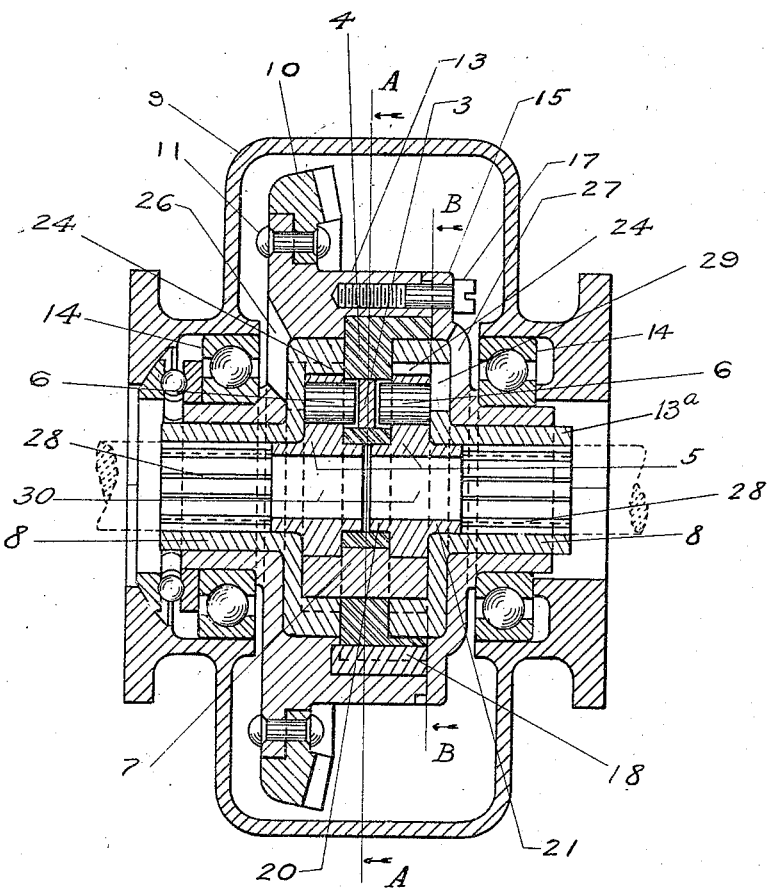
Figure 1 is a sectional view of such embodiment of my invention as applied to an automobile rear axle housing; the section cutting an insert on the line 1—1 of Fig. 3.

Figs. 4 and 4ª are separate views of the driving disk; Fig. 4 being a section on the lines D C E of Fig. 4ª. One of the separately formed inserts and one of the driving bars are shown in position in the disk openings provided therefor.

Figs. 5 and 5ª are respectively an edge and face view of a strut-carrier disk; two struts being shown in different pivotal positions therein, and an engaged driving bar being indicated, in dotted lines.

Figs. 6, 6ª and 6ᵇ are different views of a detached driving strut.

Figs. 7 and 7ª are different views of a detached driving bar.

Figs. 8 and 8ª are respectively face and edge views of the cupped axle-gear hub.

The indicated axle housing 9 and bearings 14, 14 therein may be of any desired construction adapted for assembling of the inclosed parts. The separate axle parts, indicated by dotted lines, engage the splined portions 28, 28 of the separate driven axlegear hubs 8, 8, the strains upon which are transmitted to the housing.

The driving member of my improved mechanism comprises a motor-driven casing 13, which is provided, as shown, with a ring gear 10 for connection to the motor and a central driving disk 4, the former being shown rigidly secured thereto by rivets 11 and the latter by keys 18 in key-ways 18ª; while the cover portion 15 of the casing is secured by bolts 17. This casing, with its rigid cover and driving disk is mounted in the housing bearings and incloses the other operating parts.

Each of the driven axle-gear hubs, 8, 8 has its splined axle-engaging portion 28 mounted in the hollow bearing bosses 13ª of the casing 13, and a cupped head portion 8ª rotatably fitted in the driving casing 13 to one side of the central driving disk 4 of the latter. The flange of this cupped head portion is provided with interior V-shaped grooves 24 forming strut-engaging teeth whereby the hub member is driven as hereinafter fully described. The circular openings 29 shown, are provided for lubrication hereafter referred to.

The means by which these axle-gear hubs 8, 8 are driven from the driving disk 4 of rotary casing 13, will now be described.

This is accomplished through the medium of strut-carrier disks 5, 5, which are rotatably mounted in the cupped portions of the driven axle-gear hubs 8, 8, on opposite sides of the central driving disk 4; said disks 5, 5 being formed with opposite hollow bearing bosses 21, 20 extending respectively into the adjacent hub member and the central opening of the disk 4. Each of these strut-carrier disks 5, 5 carries, as shown, two oppositely acting pairs of adjustably mounted driving struts 6, 6, 6, 6 adapted to automatically engage and disengage the teeth 24 of its inclosing hub member 8 as required for differential forward or backward driving; and each is rotated with the driving disk 4 by means of a driving bar or bars 7 carried by said driving disk and extended laterally therefrom into engaging slots 22 in the strut-container disks.

The driving bar 7, as shown, is a separate part carried by the driving disk 4; its middle portion 71 being loosely engaged in an opening 72 in disk 4, (as indicated in Fig. 4), and its oppositely projecting end portions engaging the respective strut-carrier disks 5, 5, as stated, so as to rotate the latter with disk 4.

Each driving strut 6 has a tooth-engaging rectangular body with an enlarged cylindrical head 61 adapted to loosely fit an open socket 23 of a strut-carrier disk 5; the socket opening through which the rectangular body projects, being made wide enough to permit of adjusting the latter to hub engaging or disengaging positions as indicated in Fig. 5ª, while safely retaining the strut. A semi-circular projection 62, with an approximately diametral face 63, is formed on one side of the cylindrical strut head, by means of which required turning movement is automatically imparted to the strut as hereinafter described. As shown these struts are naturally thrown outward to hub engaging position during operation by centrifugal force, but spring-pressed pins 64 are provided to retain them in projected position excepting when positively moved therefrom.

The strut carriers 5, 5 are normally rotated positively with the driving disk 4, in either forward or rearward driving, by means of the engaging driving bars 7; engagement of their out-thrown struts 6 in the tooth-grooves 24 of the axle-gear hubs 8, 8 driving the latter forwardly or rearwardly with the driving member comprising casing 13, cover 15, and disk 4. When in rounding a curve, one gear-hub 8 is caused to rotate faster than its engaged strut carrier, the struts which were engaged with said gear-hub 8 are depressed and ride loosely along the dwells 25 and the tooth grooves 24 until the curve is passed and the speed of the outer wheel becomes equal to the inner; after which they will reëngage in a tooth groove 24 and be normally driven with the disk.

When the direction of movement of the vehicle is reversed, the friction of the hub portions 21 of strut carrier 5, in the axle gear member 8, will prevent strut carrier 5 from turning with the driving disk 4 until the play allowed to the driving bar in the engaging opening 72 of the disk (indicated in Fig. 4ª) has been taken up. The effect of this limited turning movement of the disk independently of the strut carrier, is to cause the flat faces 63 of the semi-circular projections of the two driving struts previously operating, to contact with relatively inclined flat faces 80 of the semi-circular projections 81 of inserts 3 (Fig. 3) inserted in elliptical openings 82 of the driving disk 4; which contact turns inward to inoperative position as indicated in Fig. 5ª, while the other inserts 3 are simultaneously withdrawn from contact with the other driving struts 6 so as to leave them free to swing outward to their tooth-engaging position, also indicated in Fig. 5ª. The dwells 25 between the teeth grooves 24 of the axle-gear members are of such length as to allow the forward driving struts 6 to be brought to inoperative position while the backward driving struts are being projected to operative position, and vice versa.

When going down a hill the friction between the strut carriers 5, 5 and the axle gear-hubs 8, 8 similarly causes the forward-driving struts to be depressed to inoperative position and releases the backward driving struts so that they assume their operative position and engage the teeth of the axle gear hubs to prevent rotation of the latter and of their connected wheels at a higher speed than that of the motor-driven disk; thus serving to effectively prevent running away of the vehicle.

Special provision is made for insuring proper lubrication of the inclosed parts; the oil contained in the housing 13 being forced through slots 26, 27 of the rotating casing 13, 15, and openings 29 in the axle gear members 8, and distributed through oiling grooves indicated to the wearing surfaces. The improved mechanism set forth is very simple and reliable in the automatic operation required under varying conditions.

What I claim is:

1. A power transmission mechanism comprising a housing; a driving casing mounted therein and provided with a central driving disk; alined axle parts having cupped gear-hubs mounted in said casing on opposite sides of said driving disk; carrier disks mounted in the respective gear-hubs and having driving bar connection with said driving disk; and oppositely acting tooth-engaging struts pivotally mounted in each of said carrier disks; said driving bar connection being adapted to permit a slight rotary movement of said driving disk relative to the carrier disks, and said struts having setting projections operatively engaged by said driving disk.

2. A power transmission mechanism comprising in alined arrangement axle parts having gear-hubs; strut-carrier disks mounted in the respective gear-hubs; an intermediate driving disk, and driving bar connections rotatively engaging said parts; and pairs of tooth-engaging struts pivotally mounted in each of said strut-carrier disks, each of said struts having setting projections extending into engaging recesses formed in said driving disk.

3. A power transmission mechanism comprising in alined arrangement axle parts having gear-hubs; an intermediate driving disk formed with driving-bar and insert recesses; strut-carrier disks mounted in the respective gear-hubs and carrying driving-bar projections engaged in said driving-bar recesses; and pairs of forward and rearward driving-struts pivotally mounted in said strut-carrier disks and provided with setting projections engaged in said insert recesses.

4. A power transmission mechanism comprising a housing, a driving casing mounted therein and provided with a central driving disk; alined axle parts having cupped gear-hubs mounted in said casing on opposite sides of said driving disk; and a carrier disk mounted in each of said gear hubs and carrying oppositely-acting tooth-engaging struts pivotally mounted therein; said driving disk being provided with means for rotating said carrier disks and for automatically setting said struts to engage or disengage the gear hubs, and said gear hubs having strut contacting gear dwells upon which said adjustable struts freely ride.

5. A power transmission mechanism comprising a central driving disk and axially alined axle gear-hubs and interposed strut-carrier disks; oppositely acting driving struts having cylindrical portions pivotally socketed in each of said carrier disks and each provided with a semi-cylindrical extension, driving connections between said driving and carrier disks adapted to permit of limited relative rotation, and extension-engaging means in said driving disk adapted to pivotally adjust said struts.

6. A power transmission mechanism comprising a central driving disk and axially alined axle gear-hubs and interposed strut-carrier disks; oppositely acting driving struts having cylindrical portions pivotally socketed in each of said carrier disks and each provided with a semi-cylindrical extension, driving connections between said driving and carrier disks adapted to permit of limited relative rotation, and inserts in said driving disk having inclined extension-contacting faces adapted to pivotally adjust said struts upon relative movement of the disks.

7. A power transmission mechanism comprising in alined arrangement axle parts having gear-hubs; an intermediate driving disk formed with driving-bar and insert recesses; strut-carrier disks mounted in the respective gear-hubs and carrying driving-bar projections engaged in said driving-bar recesses; separate strut-setting inserts mounted in said insert recesses; and pairs of forward and rearward driving-struts pivotally mounted in said strut-carrier disks and provided with setting projections arranged to be operatively engaged by said inserts.

In testimony whereof I affix my signature.

LEVI B. PAXSON.

Copies of this patent may be obtained for five cents each, by addressing the "Commissioner of Patents, Washington, D. C."